United States Patent Office 2,999,810
Patented Sept. 12, 1961

---

2,999,810
METHOD OF KILLING ALGAE
Norman K. Sundholm, Middlebury, and Winchester L. Hubbard, Woodbridge, Conn., assignors to United States Rubber Company, New York, N.Y., a corporation of New Jersey
No Drawing. Filed June 24, 1959, Ser. No. 822,416
6 Claims. (Cl. 210—64)

This invention relates to improvements in algaecides.

We have found that 2-amino-1,4-naphthoquinone and 2-amino-3-chloro-1,4-naphthoquinone are exceptionally effective for killing chlorophyl-containing algae in water.

In practice, the algaecides of the present invention are applied to the algae by adding the chemical to the water containing the algae in amount to give the concentration in the water that will kill the desired proportion of the algae existing in the water. For economic reasons in commercial volume usages as in lakes, streams and reservoirs, as distinguished from specialized uses such as in aquatic gardens, the concentration of an algaecide used will generally not be over 1 part per million parts (p.p.m.) of the water containing the algae. The algaecides of the present invention are especially toxic in such low concentration.

The following illustrates the effectiveness of the algaecides of the present invention as compared to known quinone algaecides:

Suspensions of the 2-amino-1,4-naphthoquinone and 2-amino-3-chloro-1,4-naphthoquinone of the present invention, and suspensions of the known algaecides 2,3-dichloro-1,4-naphthoquinone and 2-dimethylamino-3-chloro-1,4-naphthoquinone (article by George P. Fitzgerald et al. in Sewage and Industrial Wastes 24, 888–896) were prepared by mixing 20 mg. of the chemical in 2 ml. of ethyl alcohol and diluting with 198 ml. of water. From these 100 parts per milion (p.p.m.) stock solutions, various volumes were added to 180 ml. of an algae culture in water in 250 ml. flasks, in which approximately the same number of algae were present. The final volume in all cases was maintained at 200 ml. by the addition of distilled water. The concentrations of the chemicals were 5, 2.5, 1 and 0.5 p.p.m. Duplicate flasks were run for each chemical at each concentration. The effectiveness of the various chemicals was determined 6 days later by estimating the percent kill by visual observation compared to the untreated check flasks. The algae culture used contained a number of species of the Chlorophyceae (green) group. The concentration of the 2-amino-1,4-naphthoquinone and 2-amino-3-chloro-1,4-naphthoquinone of the present invention required to kill 95% of the algae (LD–95) was 1 p.p.m. in each case, whereas the LD–95 concentration of 2,3-dichloro-1,4-naphthoquinone rated by Fitzgerald et al. supra as the best quinone algaecide was 5 p.p.m., and the LD–95 concentration of 2-dimethylamino-3-chloro-1,4-naphthoquinone which is the only aminonaphthoquinone disclosed in Fitzgerald et al. supra was 2.5 p.p.m.

It may be seen from the above that the 2-amino-1,4-naphthoquinone and 2-amino-3-chloro-1,4-naphthoquinone of the present invention are several times as toxic as algaecides as the known aminoquinone, viz. 2-dimethylamino-3-chloro-1,4-naphthoquinone, and the most promising quinone as reported by Fitzgerald et al., viz. 2,3-dichloro-1,4-naphthoquinone. The 2-amino-1,4-naphthoquinone and 2-amino-3-chloro-1,4-naphthoquinone of the present invention may thus be used in economic concentrations up to 1 part per million of water as a very effective algaecide.

This application is a continuation-in-part of Sundholm and Hubbard U.S. patent application Serial No. 765,059, filed October 3, 1958, now abandoned.

Having thus described our invention, what we claim and desire to protect by Letters Patent is:

1. The method of killing chlorophyl-containing algae in water which comprises applying a chemical selected from the group consisting of 2-amino-1,4-naphthoquinone and 2-amino-3-chloro-1,4-naphthoquinone to said algae.

2. The method of killing chlorophyl-containing algae in water which comprises applying 2-amino-1,4-naphthoquinone to said algae.

3. The method of killing chlorophyl-containing algae in water which comprises applying 2-amino-3-chloro-1,4-naphthoquinone to said algae.

4. The method of killing chlorophyl-containing algae in water which comprises adding a chemical selected from the group consisting of 2-amino-1,4-naphthoquinone and 2-amino-3-chloro-1,4-naphthoquinone to the water, said chemical being added in amount to give a concentration up to 1 part per million parts of said water.

5. The method of killing chlorophyl-containing algae in water which comprises adding 2-amino-1,4-naphthoquinone to the water, said 2-amino-1,4-naphthoquinone being added in amount to give a concentration up to 1 part per million parts of said water.

6. The method of killing chlorophyl-containing algae in water which comprises adding 2-amino-3-chloro-1,4-naphthoquinone to the water, said 2-amino-3-chloro-1,4-naphthoquinone being added in amount to give a concentration up to 1 part per million parts of said water.

References Cited in the file of this patent

UNITED STATES PATENTS 2,829,082    O'Brien ---------------- Apr. 1, 1958

OTHER REFERENCES

Fitzgerald et al.: Sewage and Industrial Wastes, vol. 24, No. 7, July 1952, pages 888–896, pages 888–890 particularly relied on.